United States Patent
Gevelber

(10) Patent No.: US 10,274,217 B2
(45) Date of Patent: Apr. 30, 2019

(54) INTEGRATED AIRFLOW CONTROL FOR VARIABLE AIR VOLUME AND AIR HANDLER HVAC SYSTEMS TO REDUCE BUILDING HVAC ENERGY USE

(71) Applicant: Aeolus Building Efficiency, Auburndale, MA (US)

(72) Inventor: Michael A. Gevelber, Auburndale, MA (US)

(73) Assignee: AEOLUS BUILDING EFFICIENCY, Auburndale, MA (US)

( * ) Notice: Subject to any disclaimer, the term of this patent is extended or adjusted under 35 U.S.C. 154(b) by 304 days.

(21) Appl. No.: 15/217,770

(22) Filed: Jul. 22, 2016

(65) Prior Publication Data

US 2017/0023269 A1 Jan. 26, 2017

Related U.S. Application Data

(60) Provisional application No. 62/196,410, filed on Jul. 24, 2015.

(51) Int. Cl.
*F24F 11/00* (2018.01)
*F24F 11/62* (2018.01)
(Continued)

(52) U.S. Cl.
CPC .......... *F24F 11/0001* (2013.01); *F24F 11/30* (2018.01); *F24F 11/62* (2018.01);
(Continued)

(58) Field of Classification Search
CPC ........ F24F 11/0001; F24F 11/62; F24F 11/30; F24F 11/65; F24F 2140/60;
(Continued)

(56) References Cited

U.S. PATENT DOCUMENTS

| 5,535,814 A | * | 7/1996 | Hartman | F24F 11/30 165/217 |
| 5,605,280 A | * | 2/1997 | Hartman | F24F 11/30 236/49.3 |

(Continued)

OTHER PUBLICATIONS

Katipamula, Srinivas, Lutes, Robert G., Ngo, Hung, and Underhill, Ronald M.. Transactional Network Platform: Applications. United States: N. p., 2013. Web. doi:10.2172/1108153 (Year: 2013).*

(Continued)

*Primary Examiner* — Brian W Wathen
*Assistant Examiner* — Mohammed Shafayet
(74) *Attorney, Agent, or Firm* — Duquette Law Group, LLC

(57) ABSTRACT

An airflow system includes a damper apparatus configured to adjust a flow volume of recirculated air and a flow volume of outside air within the airflow system, a variable air volume (VAV) apparatus disposed in fluid communication with the damper apparatus, and a controller disposed in operative communication with the damper apparatus and the VAV apparatus. The controller is configured to determine a percentage of outside air provided to the airflow system by the damper apparatus, determine a minimum flow volume provided by the VAV apparatus of the airflow system, which relates a required flow volume of outside air provided by the VAV apparatus to a zone and the percentage of outside air provided to the airflow system by the damper apparatus, and adjust a flow volume of air provided by the VAV apparatus to the zone based upon the determined minimum flow volume provided by the VAV apparatus.

20 Claims, 14 Drawing Sheets

(51) Int. Cl.
*F24F 11/30* (2018.01)
*F24F 11/65* (2018.01)
*F24F 110/50* (2018.01)
*F24F 110/52* (2018.01)
*F24F 140/60* (2018.01)

(52) U.S. Cl.
CPC ....... *F24F 11/65* (2018.01); *F24F 2011/0002* (2013.01); *F24F 2110/50* (2018.01); *F24F 2110/52* (2018.01); *F24F 2140/60* (2018.01); *Y02B 30/78* (2013.01)

(58) Field of Classification Search
CPC ............... F24F 2110/52; F24F 2110/50; F24F 2011/0002; Y02B 30/78
USPC ........................................................ 700/276
See application file for complete search history.

(56) References Cited

U.S. PATENT DOCUMENTS

| | | | | |
|---|---|---|---|---|
| 5,769,314 | A * | 6/1998 | Drees | F24F 3/044 236/49.3 |
| 6,296,193 | B1 * | 10/2001 | West | F24F 3/044 236/13 |
| 6,298,912 | B1 * | 10/2001 | Rayburn | F24F 11/76 165/249 |
| 6,919,809 | B2 | 7/2005 | Blunn et al. | |
| 8,423,192 | B2 | 4/2013 | Liu | |
| 2003/0064676 | A1 | 4/2003 | Federspiel | |
| 2004/0005856 | A1 * | 1/2004 | Sharp | F24F 11/0001 454/229 |
| 2005/0095978 | A1 * | 5/2005 | Blunn | F24F 11/0001 454/229 |
| 2009/0143915 | A1 | 6/2009 | Dougan et al. | |
| 2010/0057258 | A1 * | 3/2010 | Clanin | F24F 11/0001 700/276 |
| 2011/0097988 | A1 * | 4/2011 | Lord | F24F 11/77 454/256 |
| 2011/0213502 | A1 | 9/2011 | Uden | |
| 2011/0264273 | A1 | 10/2011 | Grabinger et al. | |
| 2011/0264275 | A1 * | 10/2011 | Thomle | F24F 11/006 700/276 |
| 2013/0014927 | A1 * | 1/2013 | Dazai | F24F 3/044 165/208 |
| 2013/0153195 | A1 * | 6/2013 | Wallaert | F24F 11/0012 165/239 |
| 2014/0303789 | A1 * | 10/2014 | Wroblewski | F24F 11/30 700/276 |
| 2016/0123615 | A1 * | 5/2016 | Mikulica | F24F 11/0001 165/250 |
| 2016/0131381 | A1 * | 5/2016 | Schmidlin | H04L 67/101 700/277 |
| 2016/0313748 | A1 * | 10/2016 | Leeland | G05D 23/1905 |

OTHER PUBLICATIONS

ASHRAE Standards Committee; ANSI/ASHRAE Standard 62.1-2013—Ventilation for Acceptable Indoor Air Quality; 2013.

* cited by examiner

INTEGRATED AIRFLOW CONTROL FOR VARIABLE AIR VOLUME AND AIR HANDLER HVAC SYSTEMS TO REDUCE BUILDING HVAC ENERGY USE

RELATED APPLICATIONS

This patent application claims the benefit of U.S. Provisional Application No. 62/196,410, filed on Jul. 24, 2015, entitled, "Integrated Airflow Control for Variable Air Volume and Air Handler HVAC Systems To," the contents and teachings of which are hereby incorporated by reference in their entirety.

BACKGROUND

In many commercial buildings, the heating-ventilation-and-air conditioning (HVAC) system utilizes both an economizer, to supply a mixture of outside air blended with some of the air returned from the building, and local variable air volume (VAV) apparatuses or boxes that supply conditioned air for each room (or series of rooms or a zone being served by a common supply duct). Economizers are primarily used to reduce the energy needed to condition the air supplied to the building. For example, when the outside air temperature is cooler than the return air, but higher than the desired supply temperature, economizers use more outside air in order to minimize the need to provide cooling from a machine. VAV boxes are used to vary the amount of air to that which is needed to each room (or zone), thus reducing the total amount of air used and energy used to condition and transport the air.

VAV boxes typically modulate air-flow rates as governed by the thermostat temperature reading between a minimum set-point and a maximum set-point, depending on the cooling demand of the occupied space. As the cooling load requirement for the room increases, the air-flow rate set-point increases until it reaches the maximum set-point. For heating, the air-flow rate is set to the minimum set-point value and the reheat valve position is changed according to the amount of heat required from the supply air. However, the minimum VAV air flow set-point has historically been set between 30 to 50% of the maximum air flow set-point.

The amount of supply air flow rate for each room typically needs to be high enough to ensure that ventilation and conditioning needs are met. The amount of ventilation being provided to a room is determined by the volume flow rate of outdoor air entering the room. For a VAV system utilizing an economizer, the supply air is made up of a mixture of return air (e.g., returned to an air handler unit (AHU) or air handler from rooms throughout the building) and outside air, and there might need to be significantly greater airflow than if only outside air was being supplied to the room.

Current VAV minimum airflow set points are specified considering the minimum outside air percentage designed into the AHU/economizer control. Thus, if the minimum outside air percentage is 20%, the minimum airflow set point for a VAV box is typically set to 5 times the outside air requirement for that VAV box.

Currently, the economizer dampers are controlled to achieve a desired mixed air temperature set point, $T_{mix}^{SP}$, in order to minimize the energy used to achieve desired level of dehumidification, as well as thermal conditioning (cooling as well as heating). For example, the $T_{mix}^{SP}$ can be 55° F. during the summer, to ensure humidity is controlled.

SUMMARY

Conventional HVAC control suffers from a variety of deficiencies. For example, conventional HVAC control focuses on minimizing economizer related energy, and not reducing the entire HVAC system's energy. Specifically, conventional control design minimizes economizer energy, but ignores factors that determine the total HVAC energy, which includes energy to condition the total supply air demand, as well as the cost of transporting air throughout the building. In particular, the current economizer control approach specifies a minimum outside air flow level, and this minimum level is used to determine the minimum airflow set-point for each VAV box.

As provided above, the minimum VAV air flow set-point has historically been set between 30 to 50% of the maximum air flow set-point. The drawback in setting the minimum set-point this high is that it results in high air flow rates, resulting in a significant increase in fan, heating, and cooling energy usage for the building. To minimize airflow rates, the VAV box minimum air flow rate should be set at the greater of the minimum value, which either supplies minimum out-side air flow to meet ventilation requirements or the level needed to maintain flow controllability of the VAV box.

Also as provided above, conventional economizer dampers are controlled to achieve a desired mixed air temperature set point, $T_{max}^{SP}$, in order to minimize the energy used to achieve desired level of dehumidification, as well as thermal conditioning. However, examining the outside airflow percentage for an economizer as a function of outside temperature, one can observe that:

(a) When the temperature is between $T_{mix}^{SP}$ and the temperature of the air returned from the building, $T_{RTN}$, 100% outside air should be used in the air handler. When operating in this temperature range, typically the VAV box minimums are set too high, since 100% outside air is being used.

(b) Above $T_{RTN}$, one should use a minimum amount of outside air to meet the ventilation requirements. The only guarantee that one has enough outside air is the economizer control specification that the minimum outside air percentage is above some limit.

(c) Below $T_{mix}^{SP}$, the percentage of outside air decreases to an air temperature, $T_C$, where again, the maximum amount of $Q_{RTN}$ would be used, except for the requirement that the air handler achieves at least a minimum percentage of outside air. As in case (a), in conventional systems, there is no explicit control of how much outside air is used in the economizer.

(d) Depending on the ratio of the return air flow rate relative to the supply air flow rate (which depends on the amount of return air available), one might have significantly more outside air in the mixed air, (i.e., greater than the minimum outside air percentage specification than is programmed into the air handler controls). This however, is not recognized by the VAV and economizer control systems, resulting in much higher airflow then is actually needed.

Outside air levels (e.g., both the absolute volume flow rate of outside air (OA) and the percentage of outside air, OA %) are an important aspect of controlling the economizer, since the economizer air handler is also supplying air to meet ventilation standards. In the conventional control architecture though, it is not a primary objective. Typically, the only specification is that the economizer provides a minimum % of OA (and thus will take action if not). This minimum OA % is then used in the specification of VAV min airflows in each VAV box.

With respect to supply air levels, if only a pressure set point is used to control the supply fan, then it is possible that too much supply air is being forced into the system above the needs of the VAV boxes. This high level could exist in spite of having VAV boxes close down if there is significant other exhaust in the building, or areas that supply follow can flow directly into the return ducts, or other areas for significant area leakage. Thus it is desirable to either use pressure reset (which enables VAV box dampers to open up, but reducing pressure set point), or explicitly determine how much supply air is demanded from the settings in the VAV boxes.

Analysis of the energy and the related cost used to both condition and transport air reveals that for a variety of major US cities (Boston, New York, Washington D.C., and Los Angeles), that the percentage of cubic feet per minute (cfm) cost is dominated by fans (e.g., from approximately 34 to 45%), which occurs since fans are driven by electric motor drives. Thus while cooling is typically driven by electric chillers, they account for only approximately 27 to 44% of the total cost per cfm. Therefore, it can be more desirable to reduce airflow rather than only for optimizing thermal conditioning for achieving the desired mixed air temperature set point.

By contrast to conventional HVAC systems, embodiments of the present innovation relate to an integrated airflow control for variable air volume and air handler HVAC systems to reduce building HVAC energy use. In one arrangement, an airflow system is configured to reduce excess building airflow rates and, therefore, save substantial energy used to condition and transport un-needed airflow, which can also reduce related HVAC operating costs. For example, the airflow system includes one or more controllers configured to dynamically adjust a minimum airflow set-point for each VAV apparatus in the system based on an actual percentage of outside air being supplied by the air handler. The controller is also configured to allow an economizer or damper apparatus to explicitly and dynamically meet the ventilation requirements for outside air needed throughout the building.

Embodiments of the innovation optimize the energy use for the entire HVAC system, i.e., including fan energy by minimizing airflow demand while meeting fresh air ventilation requirements. In particular, operation of the economizer and the percentage of outside air used determine the need for a minimum air flow setting of each VAV apparatus in the system. By contrast, conventional state-of-the-art control systems do not dynamically take this into account. The typical current building HVAC control architecture utilizes statically set minimum airflow settings for all the VAV controllers in the building. These settings result in a large minimum airflow since they are designed based on a minimum outside air-flow specification for the related air handler unit. However, in practice, economizer air handlers dynamically vary outside air percentage depending on the outside air temperature in relation to the mixed air temperature.

Further, embodiments of the innovation provides that the economizer control dynamically meets the ventilation requirements for outside air and also dynamically adjusts the minimum VAV airflow demand (instead of always operating under a worse case condition). This is easily accommodated into the current hardware/control configuration, but yields a substantial reduction in airflow for different climate zones.

With implementation of embodiments of the innovation:
a) the required outside air percentage is dynamically adjusted to meet the ventilation requirements of the building and the economizer can provide that this ventilation level is achieved; and b) the percentage of outside air value is sent to all the VAV controllers, so that each VAV apparatus can adjust its minimum airflow set point level, $Q_{VAV,min}$, needed in order to meet the ventilation requirement for its rooms. By contrast, the conventional control architecture is designed with a control objective such that the economizer achieves in the worst case a minimum OA percentage (% $OA_{min,fixed}$), and this value is used to calculate the fixed VAV minimum flow rate. In many cases, the % of minimum OA ((% $OA_{min,fixed}$) for the economizer is between 20-30%, which thus requires 5 to 3 times more minimum default air flow in all VAV apparatuses when the economizer is running at 100% OA.

In one arrangement, the controller or control architecture of the airflow system includes several components. For example, a first component of the control architecture is configured to dynamically adjust the minimum VAV apparatus flow set point. It does this by using a floating value of outside air percentage to each VAV apparatus, wherein the minimum supply air set point is adjusted. The VAV apparatus then provides that the minimum air flow rate is achieved for that box (unless additional air is required for thermal conditioning as called for by a thermostat). This provides that the amount of outside air required for that space to meet ventilation requirements is achieved. The difference from the conventional design is that the ventilation requirement was met by potentially setting a high minimum air flow level in each box. With embodiments of the innovation, the total amount of outside air is specified and the dampers adjusted to ensure this amount is used. Thus, the current and time varying % OA value can be used to determine the VAV apparatus minimum, since the economizer damper controls ensure that this level has at least the minimum amount of outside air needed.

A second component of the control architecture is configured to provide that an actual amount of ventilation outside air is achieved while the HVAC system is running. With embodiments of the innovation, this is done by adjusting the economizer dampers to ensure that the minimum outside air percentage required is achieved. This provides that, in spite of varying supply air requirements, the amount of outside air is achieved.

A third component of the control architecture is configured to provide that the system varies the amount of supply air. Since the amount of supply air varies depending on the floating ventilation requirements, as well as the time varying VAV air flow requirements for cooling, the system is configured to dynamically adjust the amount of supply air flow. This can be done, for example, either through a technique such as pressure reset, or by a method where the amount of supply air for each VAV apparatus is reported to the air-handler controller, and the supply pressure is adjusted to achieve that level of control.

In one arrangement, embodiments of the innovation relate to an airflow system comprising a damper apparatus configured to adjust a flow volume of recirculated air and a flow volume of outside air within the airflow system, a variable air volume (VAV) apparatus disposed in fluid communication with the damper apparatus, and a controller having a processor and a memory, disposed in operative communication with the damper apparatus and the VAV apparatus. The controller is configured to determine a percentage of outside air provided to the airflow system by the damper apparatus based upon at least one of (i) an air temperature, (ii) an air pressure, and (iii) a damper position of a damper apparatus of the airflow system; determine a minimum flow volume provided by the VAV apparatus of the airflow system, the minimum flow volume relating a required flow volume of outside air provided by the VAV apparatus to a zone and the percentage of outside air provided to the airflow system by the damper apparatus; and adjust a flow volume of air provided by the VAV apparatus to the zone based upon the determined minimum flow volume provided by the VAV apparatus.

In one arrangement, embodiments of the innovation relate to, in a damper apparatus of an airflow system, a method of adjusting airflow. The method includes determining, by a controller of the airflow system, an estimated percentage of outside air received by the damper apparatus based upon an outside air temperature, a mixed air temperature, the mixed air which includes a recirculated air and outside air, and a return air temperature; determining, by the controller, a required percentage of outside air provided by the damper apparatus; and relating, by the controller, the estimated percentage of outside air to the required percentage of outside air. When the relation between the estimated percentage of outside air and the required percentage of outside air is less than a threshold value, the method includes increasing, by the damper apparatus, the flow volume of outside air provided by an outside air damper and decreasing the flow volume of recirculated air provided by a recirculating air damper.

In one arrangement, embodiments of the innovation relate to, in an airflow system, a method of adjusting airflow. The method includes determining, by a damper apparatus, an estimated percentage of outside air provided to the airflow system based upon an outside air temperature and a mixed air temperature, the mixed air including recirculated air and outside air; determining, by the damper apparatus, a required percentage of outside air provided by the damper apparatus; relating, by the damper apparatus, the estimated percentage of outside air to the required percentage of outside air; and when the relation between the estimated percentage of outside air and the required percentage of outside air is less than a threshold value, increasing, by the damper apparatus, the flow volume of outside air provided by an outside air damper and decreasing the flow volume of recirculated air provided by an recirculating air damper. The method includes determining, by a variable air volume (VAV) apparatus, a minimum flow volume provided by the VAV apparatus of the airflow system, the minimum flow volume relating a required flow volume of outside air provided by the VAV apparatus to a zone and the estimated percentage of outside air provided to the airflow system by the damper apparatus; and adjusting, by the VAV apparatus, a flow volume of air provided by the VAV apparatus to the zone based upon the determined minimum flow volume provided by the VAV apparatus.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to an integrated airflow control for variable air volume and air handler HVAC systems to reduce building HVAC energy use. In one arrangement, an airflow system is configured to reduce excess building airflow rates and, therefore, save substantial energy used to condition and transport un-needed airflow, which can also reduce related HVAC operating costs. For example, the airflow system includes one or more controllers configured to dynamically adjust a minimum airflow set-point for each VAV apparatus in the system based on an actual percentage of outside air being supplied by the air handler. The controller is also configured to allow an economizer or damper apparatus to explicitly and dynamically meet the ventilation requirements for outside air needed throughout the building.

Figure 1:
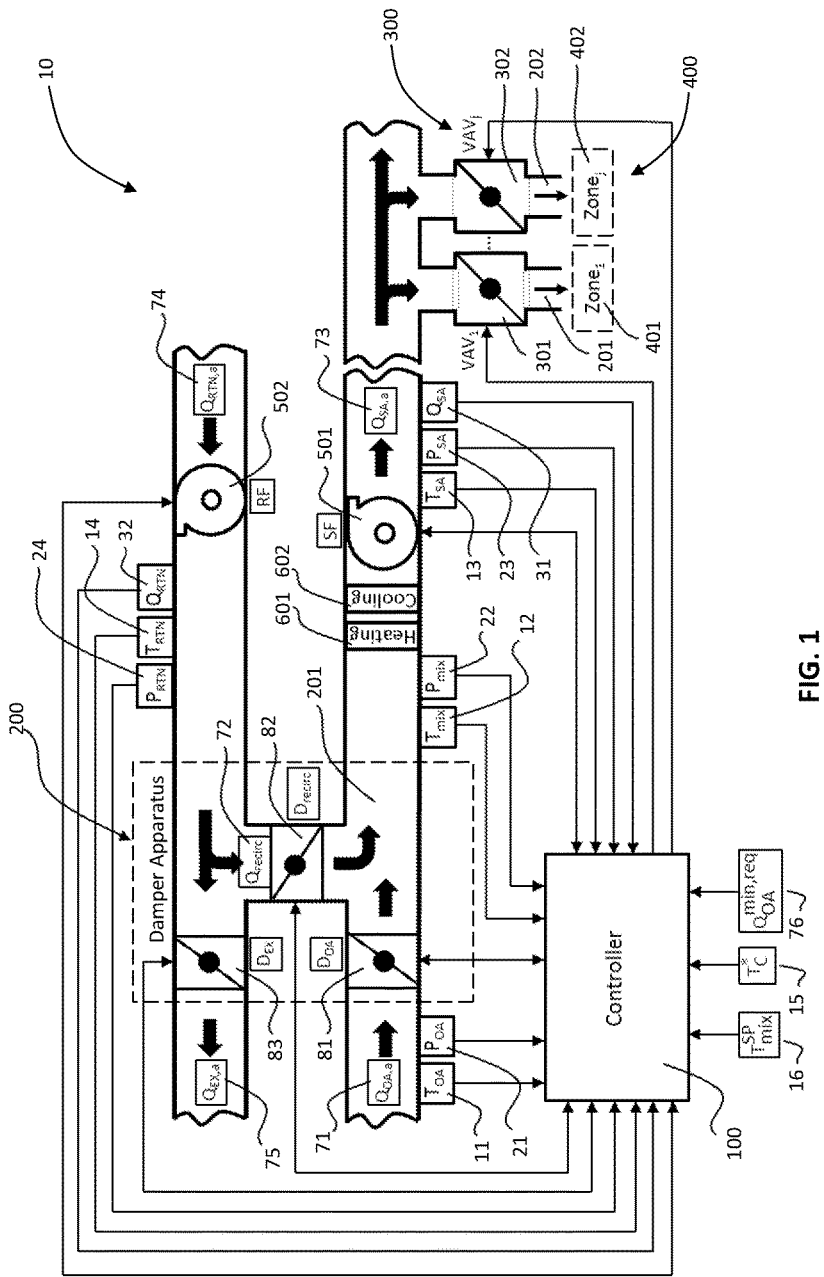
FIG. 1 is a schematic diagram of an integrated economizer and variable air volume control system, according to one arrangement.

FIG. 1 illustrates an example of an airflow system 10, which is configured to control the airflow of a building (not shown). The airflow system 10 can include a damper apparatus 200 and a variable air volume (VAV) apparatus 300. Each of the damper apparatus 200 and VAV apparatus 300 are disposed in electrical or operative communication with a controller 100, such as a memory and processor, which is configured to integrate control of both apparatuses 200, 300.

The damper apparatus 200, also referred to as an economizer herein, is configured to blend outside air 71 that is supplied to the building with recirculated air 72 from the building. Outside air and recirculated air are modulated by the outside airflow damper ($D_{OA}$) 81 and the recirculating air damper ($D_{recirc}$) 82 with the intent to minimize energy consumption in conditioning the air. The mixed and conditioned air is supplied to the VAV apparatus 300.

Figure 2A:
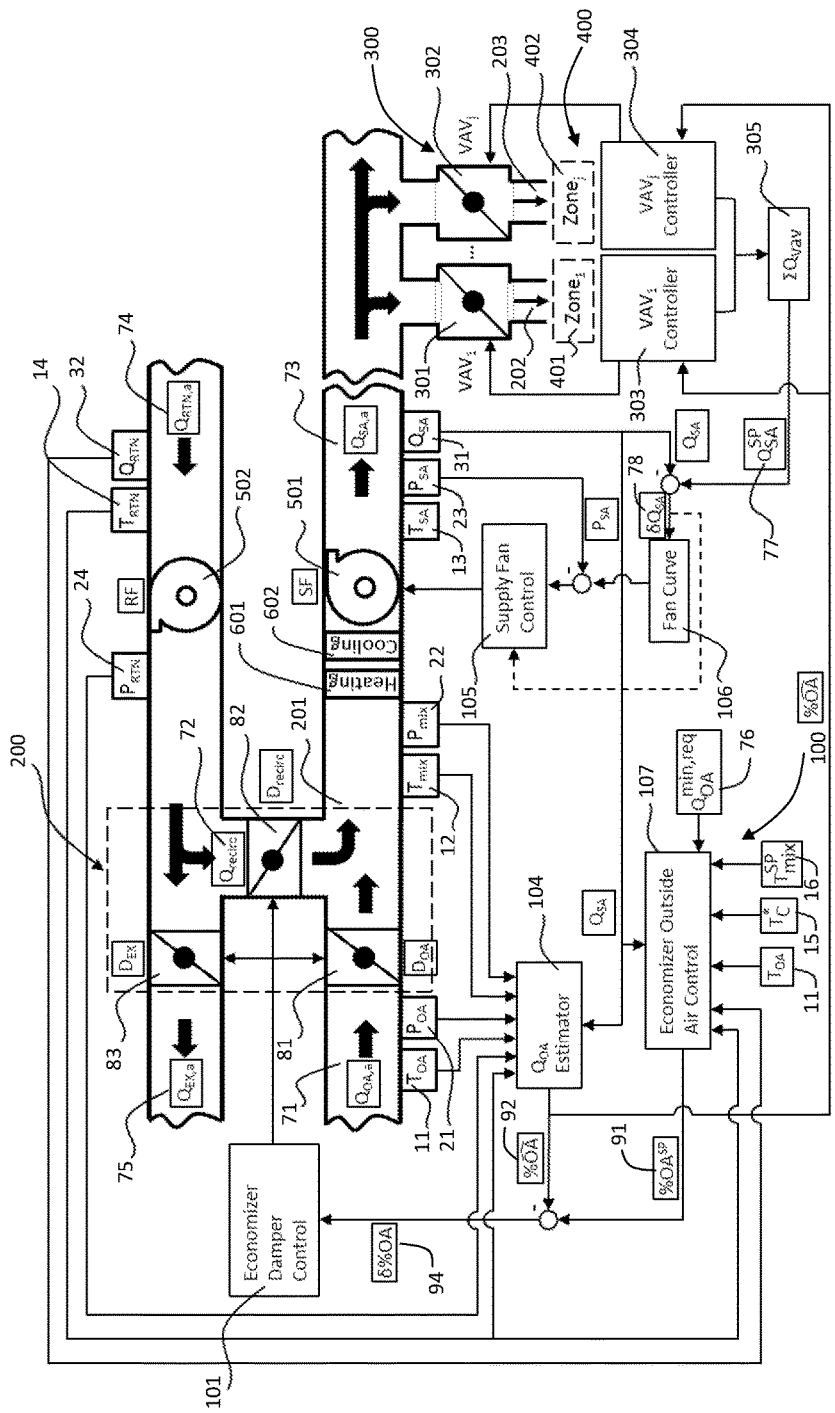
FIG. 2A is a schematic diagram of an integrated economizer using a distributed control implementation and variable air volume control system, according to one arrangement.
Figure 2B:
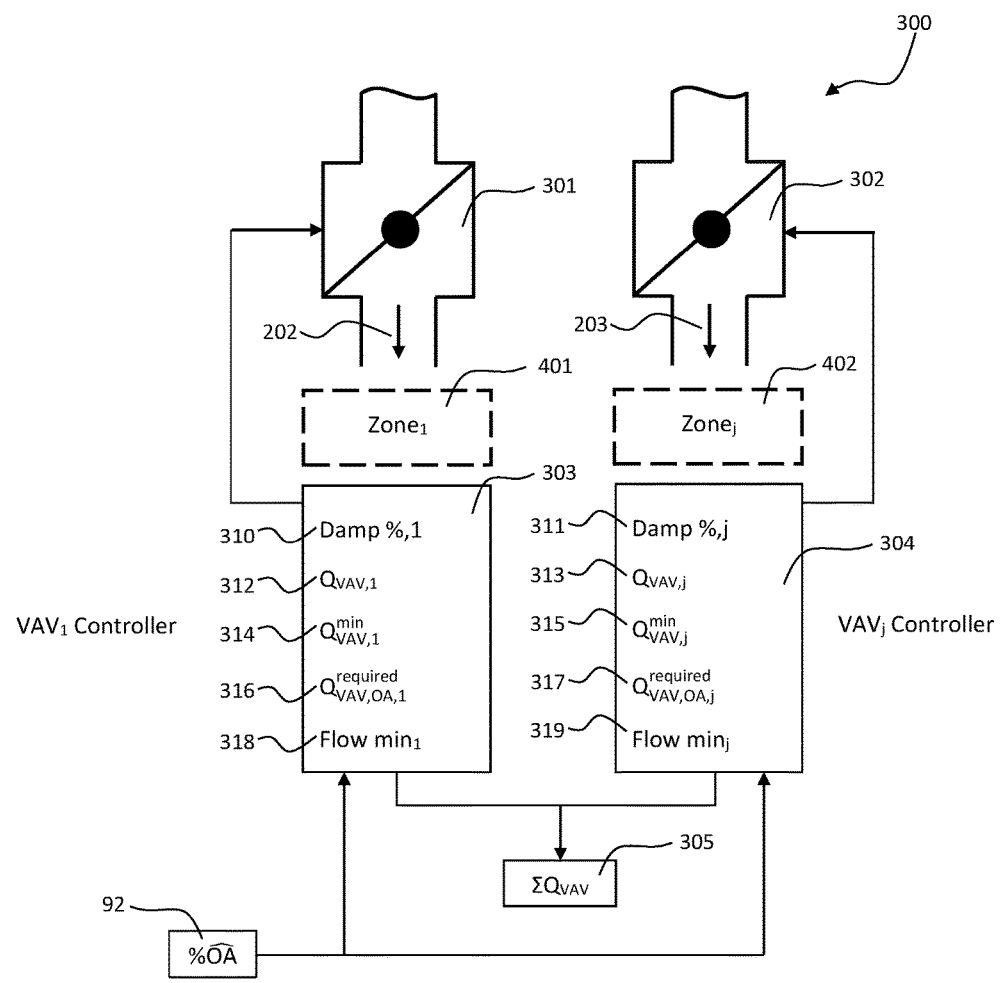
FIG. 2B is a diagram of controllers for each VAV apparatus, according to one arrangement.

The VAV apparatus 300 can be configured as one or more VAV apparatuses (e.g., VAV1 301 to VAVj 302) and are configured to control the flow of air into different corresponding spatial zones 400 (e.g., Zone1 401 to Zonej 402) and rooms within the building. The VAV apparatuses 301, 302 for each zone each include a damper to modulate a supply air flow 73 for each zones' supply air 202, 203. For example, as shown in FIG. 2B for the jth zone 402, the damper position, Damp %, j, 311 is adjusted to obtain the desired airflow 203 into the zone 402. The VAV dampers for each VAV apparatus 301, 302 can be controlled by the controller 100 to supply a required minimum flow of air 314, 315 and a required flow of OA 316, 317 to the zones 401, 402 to meet indoor air quality standards and to ensure thermal comfort for occupants in the zone.

The controller 100 is configured to operate the damper apparatus 200 and VAV apparatus 300 based upon both data received from sensors and user specifications. In one arrangement, the controller 100 is configured to execute control logic, as provided below, to control various aspects or components of the airflow system 10.

The system 10 integrates the control of the damper apparatus 200 and VAV apparatus 300 to minimize airflow in order to save energy while still meeting outside air ventilation requirements. As will be described below, the controller 100 is configured to determine a percentage of outside air provided by the damper apparatus 200 and the minimum outside air set point to each zone by the VAV apparatus 300. The controller 100 is configured to relate these values to update the minimum airflow needed to be supplied by each VAV apparatus 300 which the controller 100, for each apparatus 300, adjusts to ensure airflow conditions are achieved.

In one arrangement, data (e.g., signals provided by a variety of sensors) used by the controller 100 can include the damper position for outside air ($D_{OA}$) 81, damper position for recirculating air ($D_{recirc}$) 82, and damper position for exhaust air ($D_{EX}$) 83 (e.g., which adjusts the flow of exhaust air 75) within the damper apparatus 200; air temperature sensor measurements for outside airflow ($T_{OA}$) 11, mixed airflow ($T_{mix}$) 12, supply airflow ($T_{SA}$) 13, and return airflow ($T_{RTN}$) 14; pressure measurements for outside airflow ($P_{OA}$) 21, mixed airflow ($P_{mix}$) 22, supply airflow ($P_{SA}$) 23, and return airflow ($P_{RTN}$) 24 that may also be used to determine air flow rates in conjunction with the damper positions; flow volume measurements, $Q_{SA}$, $Q_{RTN}$, 31, 32; and supply fan, SF, 501 and return fan, RF, 502 settings.

Using this data (e.g., signals), the controller 100 is configured to determine a variety of factors to control aspects of the system, such as the critical economizer switching temperature, $T_C^*$, 15, which depend on user specified temperature set point and OA required airflow rates, $T_{mix}^{SP}$, 16, $Q_{OA}^{min,req}$, 76; and controller outputs can include damper position settings 81, 82, 83 to control the flow rates of outside air and recirculated air, fan settings 501, 502, and airflow settings for the VAV apparatuses 301, 302.

The controller 100 illustrated by FIG. 1 is provided by way of example only. The controller 100 can be configured in a variety of ways. For example, FIG. 2A, illustrates the controller 100 as being decentralized and distributed as local control modules, such as economizer damper controller 101 and economizer controllers 104, 107, supply fan modulation controllers 105, 106, 305, and VAV damper controllers 303, 304. These controllers distribute the execution of the algorithm implementation to different parts of the system 10 and are configured to communicate with one another as needed. In the embodiment shown in FIG. 2A, each VAV apparatus 301, 302 can be controlled by a separate controller 303, 304 for each corresponding VAV apparatus 301, 302, which determines the appropriate flow rate to each zone. FIG. 2B shows the data (e.g., signals or variables) of VAV apparatuses 300 and separate controllers 303, 304.

Figure 3A:
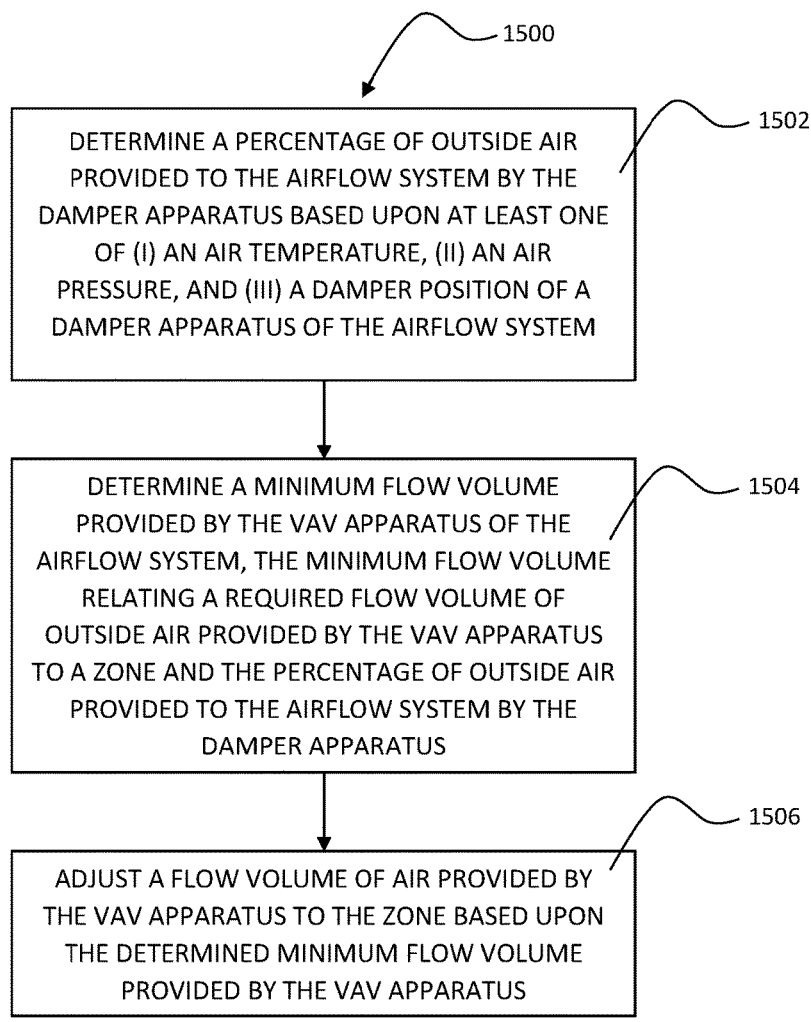
FIG. 3A is a flowchart of an example procedure performed by the controller of FIG. 1, according to one arrangement.

As provided above, the controller 100 is configured to integrate the control of the damper apparatus 200 and VAV apparatus 300 to minimize airflow in order to save energy while still meeting outside air ventilation requirements. In one arrangement, when providing such integration, the controller 100 is configured to execute the processing elements as provided in the flowchart 1500, as illustrated in FIG. 3A.

In step 1502, the controller 100 is configured to determine a percentage of outside air provided to the airflow system 10 by the damper apparatus 200 based upon at least one of (i) an air temperature, (ii) an air pressure, and (iii) a damper position of a damper apparatus 200 of the airflow system 10.

For example, with reference to FIG. 2A, during operation of the damper apparatus 200, the flow of outside air, $Q_{OA,a}$, 71 is supplied from an outside air intake (not shown). The controller 100 is configured to control the flow volume of outside air based upon the position of an actuating outside air damper, $D_{OA}$, 81. A portion of the return flow is diverted as recirculated air, $Q_{recirc,a}$, 72 from return air, $Q_{RTN,a}$, 74 from the building which flows from a return fan, RF, 502. The amount of air recirculated into the system, $Q_{recirc,a}$, 72 is modulated by the position of the recirculation damper, $D_{recirc}$, 82 and exhaust air damper, $D_{EX}$, 83, both of which are controlled by the controller 100. The recirculated air is mixed with outside air in a mixed air plenum 201 and this mixed air has a temperature $T_{mix}$, 12. The mixed air flows through cooling 601 and heating coils 602 to condition the air, and then flows through a supply fan, SF, 501. This conditioned air is called the supply air, $Q_{SA,a}$, 73.

The required outside air for the building, $Q_{OA}^{min,req}$, 76 based on ventilation standards set forth in American Society of Heating, Refrigerating, and Air-Conditioning Engineers (ASHRAE) 62.1, can be a static amount based on total expected occupancy conditions of the building. The total required outside air flow can be determined through a calculated maximum expected occupancy of the building based on analysis of the sum of individual zone usage and occupancy. However, the required OA airflow can dynamically vary and be based upon a changing number of occupants. The sum of the flow volume supplied to all zones, $\Sigma Q_{VAV}$, 305 is used to calculate the supply air set point, $Q_{SA}^{SP}$, 77. $Q_{SA}^{SP}$ is compared to the measured supply air flow 31 and the difference, $\delta Q_{SA}$, 78 is used to adjust the supply fan 501 and return fan 502. The minimum required outside air 76 is used by the economizer controller 100, such as when executing the economizer outside air control 107, to determine an estimated outside air percentage, $\widehat{\%OA}$, 92 used by both the economizer damper control 101 and the VAV controllers 303, 304. This is illustrated as element 1001 in FIG. 3B.

Returning to FIG. 3A, in step 1504, the controller 100 is configured to determine a minimum flow volume provided by the VAV apparatus 300 of the airflow system 10, the minimum flow volume relating a required flow volume of outside air provided by the VAV apparatus 300 to a zone and the percentage of outside air 92 provided to the airflow system by the damper apparatus 200.

The required flow volume of outside air is used to establish a percentage of outside air needed and the economizer dampers 81, 82, 83 are adjusted accordingly. The percentage of outside air supplied by the damper apparatus can be determined by measurements collected by at least one of following: air temperature sensors ($T_{OA}$, $T_{mix}$, $T_{SA}$, $T_{RTN}$) 11, 12, 13, 14; air pressure sensors ($P_{OA}$, $P_{mix}$, $P_{SA}$, $P_{RTN}$) 21, 22, 23, 24; damper positions ($D_{OA}$, $D_{recirc}$, $D_{EX}$) 81, 82, 83; or other suitable sensors.

In one arrangement, to provide adequate or proper ventilation in a zone, such as $zone_j$ 402, the controller 100 is configured to determine a minimum flow volume, $Q_{VAV,j}^{min}$, 315 to be provided by the VAV apparatus 302 based on the minimum flow volume of outside air required, $Q_{VAV,OA,j}^{required}$, 317 by the zone 402, and the percentage of outside air, % $\widehat{OA}$, 92 being provided by the damper apparatus 200. For example, the minimum outside air supplied to the zone is determined to meet indoor air quality standards, such as those set forth in American Society of Heating, Refrigerating, and Air-Conditioning Engineers (ASHRAE) 62.1, based upon the outside air required by the zone use and expected occupancy. Occupancy sensors connected to the zone may signal a change in the required outside air based upon different zone occupancy. These changes can be used to alter the value of $Q_{OA}^{min,req}$ 76. Other control logic, such as those for meeting heating and cooling requirements, may also change the flow to individual zones supplied by different VAV apparatuses, and can work in parallel with the different control loops of embodiments of the innovation.

Figure 3B:
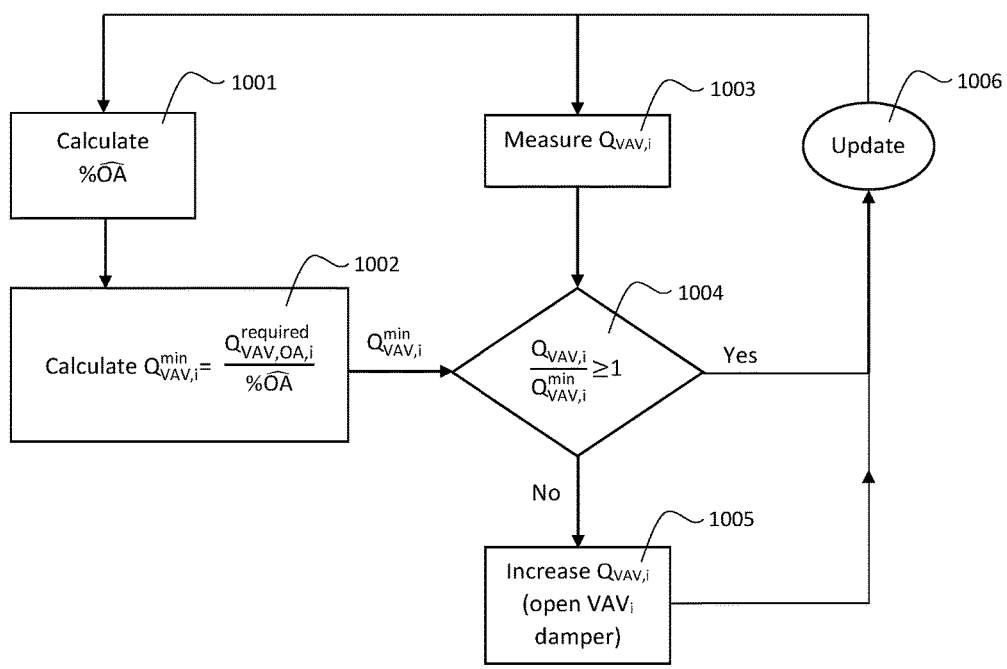
FIG. 3B is a flow diagram of example control logic executed by the controller of FIG. 1, to determine a minimum outside air requirement based on varying % OA, according to one arrangement.

When determining a minimum flow volume provided by the VAV apparatus 300 of the airflow system 10, the controller 100 can be configured to execute the control action of element 1002. The control processes illustrated in FIGS. 3B, 4, and 5 for control of VAV apparatuses, are written in terms of a generic VAV apparatus i instead of a specific VAV apparatus 1 and j of FIGS. 2A and 2B. In FIG. 3B for example, the controller 100 is configured to read the $Q_{VAV,OA,i}^{required}$ value (e.g., 316, 317 of FIG. 2B) which is the required flow volume of outside air for the VAV apparatus 300 to a zone. The controller 100 is further configured to calculate the % OA supplied by the damper apparatus 200 in control element 1001. In 1002, the required OA for a VAV apparatus 300 is divided by the % $\widehat{OA}$ 92, supplied by the damper apparatus, to determine the minimum air flow that the VAV apparatus 300 needs to supply, $Q_{VAV,i}^{min}$. For example, when executing control process element 1002, the controller 100 is configured to determine the minimum flow volume required by the VAV apparatus, $Q_{VAV,i}^{min}$, as a ratio of $Q_{VAV,OA,i}^{required}$ and % $\widehat{OA}$:

$$Q_{VAV,i}^{min} = \frac{Q_{VAV,OA,i}^{required}}{\% \widehat{OA}} \quad \text{Eqn. 1}$$

In control element 1004, the controller 100 compares the actual flow volume of air $Q_{VAV,i}$ (e.g., 312 and 313 in FIG. 2B) provided by the VAV apparatus 300, to the $Q_{VAV,i}^{min}$ from 1002. If the ratio is less than 1, the controller 100 executes element 1005 and opens the VAV damper to increase $Q_{VAV}$.

Returning to FIG. 3A, in step 1506, the controller 100 is configured to adjust a flow volume of air provided by the VAV apparatus 300 to the zone based upon the determined minimum flow volume provided by the VAV apparatus 300.

In one arrangement, and with reference to FIG. 3B, when performing step 1506, the controller 100 is configured to execute control element 1003 to measure an actual flow volume of air provided by the VAV apparatus 300 (i.e., to determine individual VAV apparatus flow rates, $Q_{VAV,i}$).

The controller 100 is then configured to execute control element 1004 to relate the actual flow volume of air provided by the VAV apparatus 300 to the determined minimum flow volume provided by the VAV apparatus 300. For example, with continued reference to FIG. 3B, the controller 100 is configured to compare $Q_{VAV,i}^{min}$, as provided when executing control element 1002, to the actual flow volume of the air provided by the VAV apparatus, $Q_{VAV,i}$, as provided when executing control element 1003.

In the case where the relation between the actual flow volume of air provided by the VAV apparatus, $Q_{VAV,i}$, and the minimum flow volume provided by the VAV apparatus, $Q_{VAV,i}^{min}$, is less than a threshold value, in this case a threshold value of 1, the controller is 100 configured to adjust a position of a damper of the VAV apparatus to increase a volume of the actual flow volume of air provided by the VAV apparatus. For example, if $Q_{VAV,i}$ is less than $Q_{VAV,i}^{min}$ (condition in control element 1004 is not met) the controller 100 is configured to execute control element 1005 to increase the flow volume from the VAV apparatus 300 by adjusting the damper position 310, 311 (e.g., opening) the VAV damper.

Regardless of the outcome of control element 1004, the controller 100 is configured to execute the control element 1006 to update the actual flow volume of air provided by the VAV apparatus, $Q_{VAV,i}$, and to repeat the entire process. That is, the controller 100 can continue to execute control element 1003 to receive updated measurements of the actual flow volume of air provided by the VAV apparatus 300. Such updated flow volume measurements can be provided by a flow volume sensor associated with the VAV apparatus 300. Updates to flow rates can occur at a suitable user-defined time interval for proper zone performance considering zone air mixing. Typical values may include 5, 10, 15, or 30 minute intervals. Next, when executing element 1004, the controller 100 is then configured to relate the updated actual flow volume of air provided by the VAV apparatus 300 to the determined minimum flow volume $Q_{VAV,i}^{min}$. Such a configuration allows monitoring and potential adjustment of the airflow system 10 in a substantially continuous manner over time.

In one arrangement, the VAV apparatus 300 (e.g., VAV apparatuses 301, 302) can be configured with a minimum flow setting to work properly, such as specified by the manufacturer. The VAV apparatus 300 can adjust the flow volume provided to each zone 401, 402 determined by a particular minimum flow, such as a required minimum flow. Accordingly, the controller 100 can be configured to adjust operation of the VAV apparatus 300 to provide a minimum VAV apparatus-required flow rate, Flow $min_i$ (e.g., 318, 319) required for proper operation of the VAV apparatus 300 such as based upon a manufacturer's specification or system design.

Figure 4:
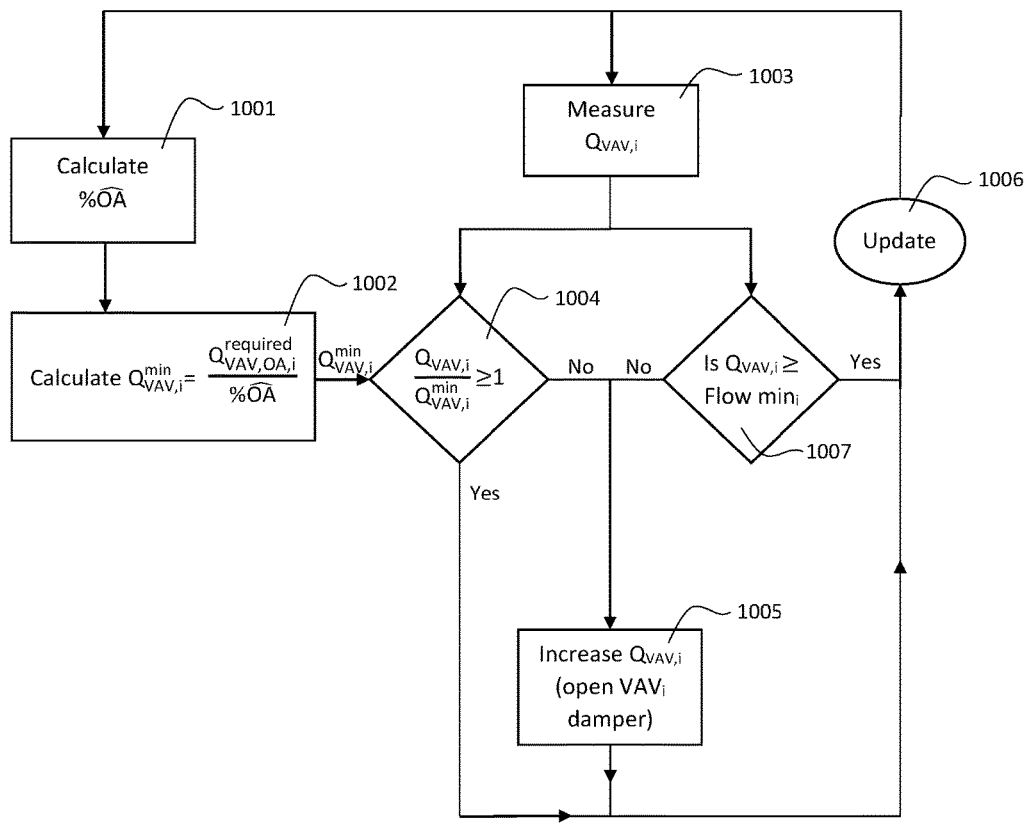
FIG. 4 is a flow diagram of example control logic executed by the controller of FIG. 1 to provide that a minimum flow specification for a VAV apparatus is met, according to one arrangement.

For example, with reference to FIG. 4, the controller 100 is configured to execute control element 1007. As indicated, the controller 100 is configured to compare the actual flow volume of air provided by the VAV apparatus, $Q_{VAV,i}$, to the minimum VAV apparatus-required flow volume value, Flow $\text{min}_i$. If $Q_{VAV,i}$ is less than or below the minimum flow rate Flow $\text{min}_i$ the controller 100 is configured to execute control element 1005 to adjust a position of (e.g., open) the damper of the VAV apparatus 300 to increase a volume of the actual flow volume of air provided by the VAV apparatus, $Q_{VAV,i}$. Alternately, if the actual flow volume of air provided by the VAV apparatus is greater than the minimum VAV apparatus-required flow volume value, the controller 100 is configured to maintain the position of (e.g., neither open nor close) the damper of the VAV apparatus 300 to maintain the volume of the actual flow volume of air provided by the VAV apparatus. As illustrated, the controller 100 is configured to execute control element 1006 to update the values of $Q_{VAV,i}$ and % OA at a suitable time interval relevant to the VAV/zone operation by repeating the control process steps 1001, 1002, 1003, 1004, 1005, and 1007.

As indicated above, the control elements illustrated in FIGS. 3A, 3B, and 4 can be executed in a central controller 100 or in individual local VAV controllers 303, 304. Local control implementation requires data from the control modules including 104, in terms of % $\widehat{OA}$ 92. When there are multiple individual controllers, each local VAV controller 303, 304 is configured to implement the control process shown in FIG. 3B or 4, which includes calculating the minimum flow rate for that VAV apparatus 300 based on the OA % supplied from the damper apparatus 1002, measuring the air flow rate for that VAV apparatus 1003, comparing the VAV air flow rate to the minimum required flow rate 1004, and adjusting the VAV flow rate by adjusting the VAV damper position 1005. In the case of implementing the minimum VAV apparatus flow level, each VAV controller 303, 304 is configured to execute control element 1007.

The local VAV controller 303, 304 for each VAV apparatus is also configured to perform an update 1006 of these control operations. In FIGS. 3B and 4, this includes repeating processes 1001 and 1003, and then performing processes 1002, 1004, 1007, and 1005 with the updated values for % $\widehat{OA}$ 92 and VAV flow rate. Update periods would be set based on the different time scales for the VAV apparatuses 300 (e.g., typically faster than the time scale of thermal changes of the zone). A similar update process is executed for the economizer control processes shown in FIG. 5 (e.g. for control processes 1010 through 1016. However, the update period for economizers are typically slower, due to the large volumes of air being mixed and on the time scales of the changes in thermal condition of the outside air.

While the controller 100, as described above, is configured to monitor and control operation of the VAV apparatus 300, the controller 100 can also be configured to monitor and control operation of the damper apparatuses or economizers 200, as well. As will be provided below, the controller 100 is configured to adjust the position of dampers 81, 82, 83 of the damper apparatus 200 to provide the outside air needed as specified by % $OA^{SP}$ 91. For example, in order to regulate a total flow volume of outside air delivered to a building, the controller 100 is configured to execute the control elements shown in FIG. 5 to determine if $Q_{OA}$ needs to be adjusted by changing the damper apparatus 200.

Figure 5:
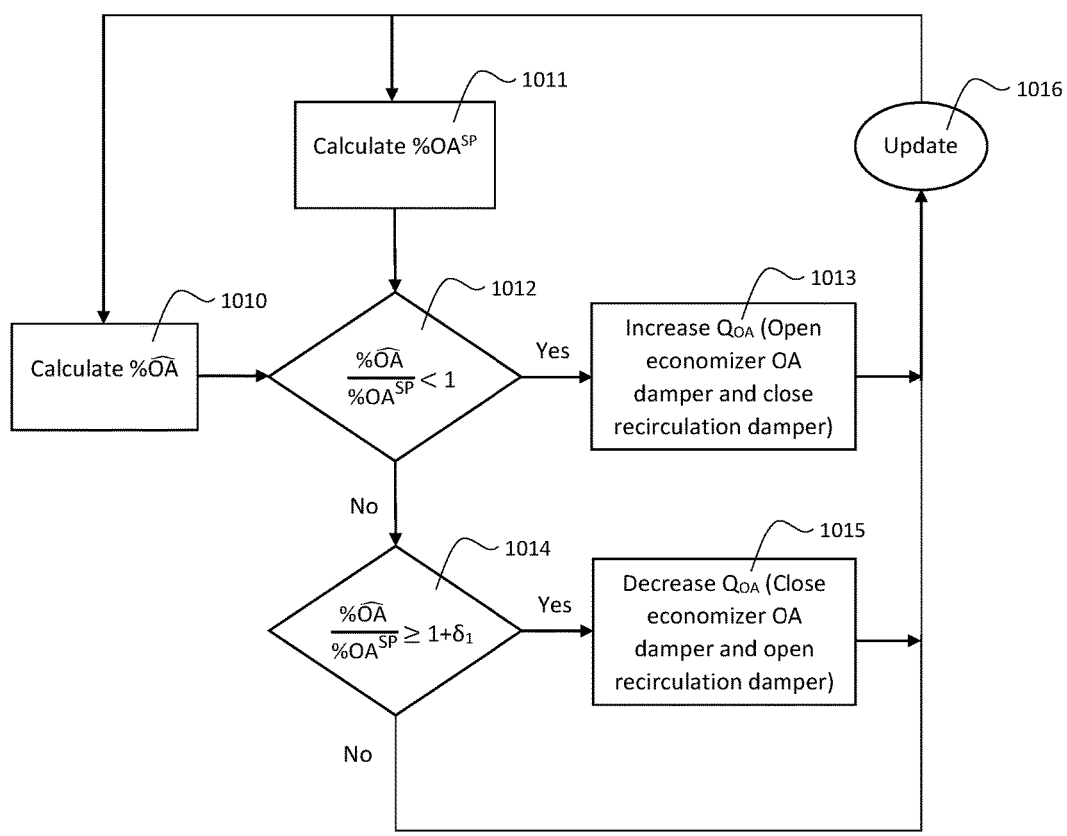
FIG. 5 is a flow diagram of example control logic executed by the controller of FIG. 1 to adjust the economizer dampers to meet the outside air requirements, according to one arrangement.
Figure 6:
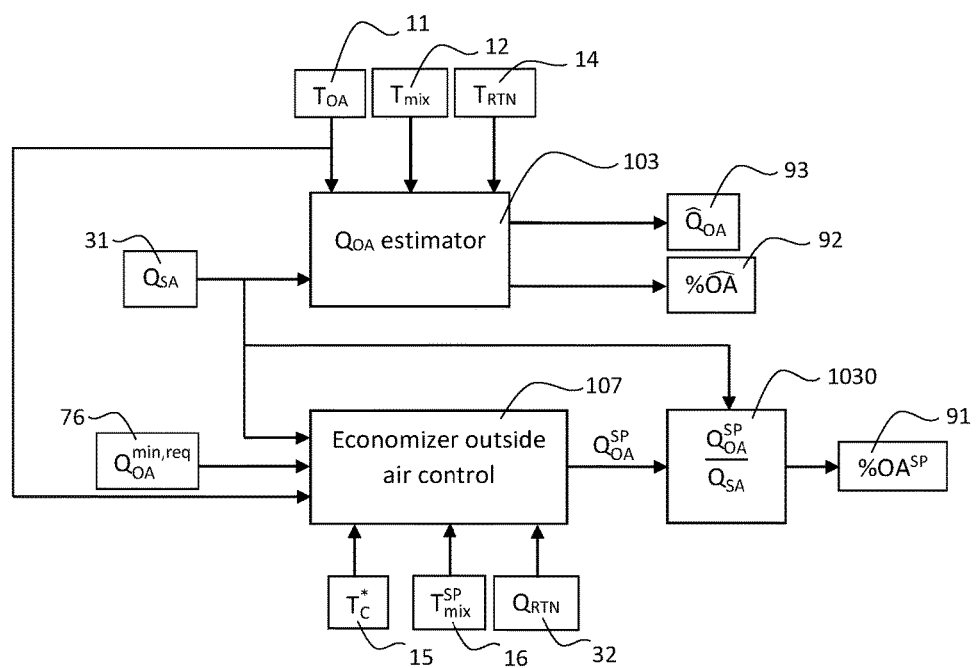
FIG. 6 is a block diagram of an outside air estimation process for the economizer outside air control to provide outside air percentage set point, according to one arrangement.
Figure 7:
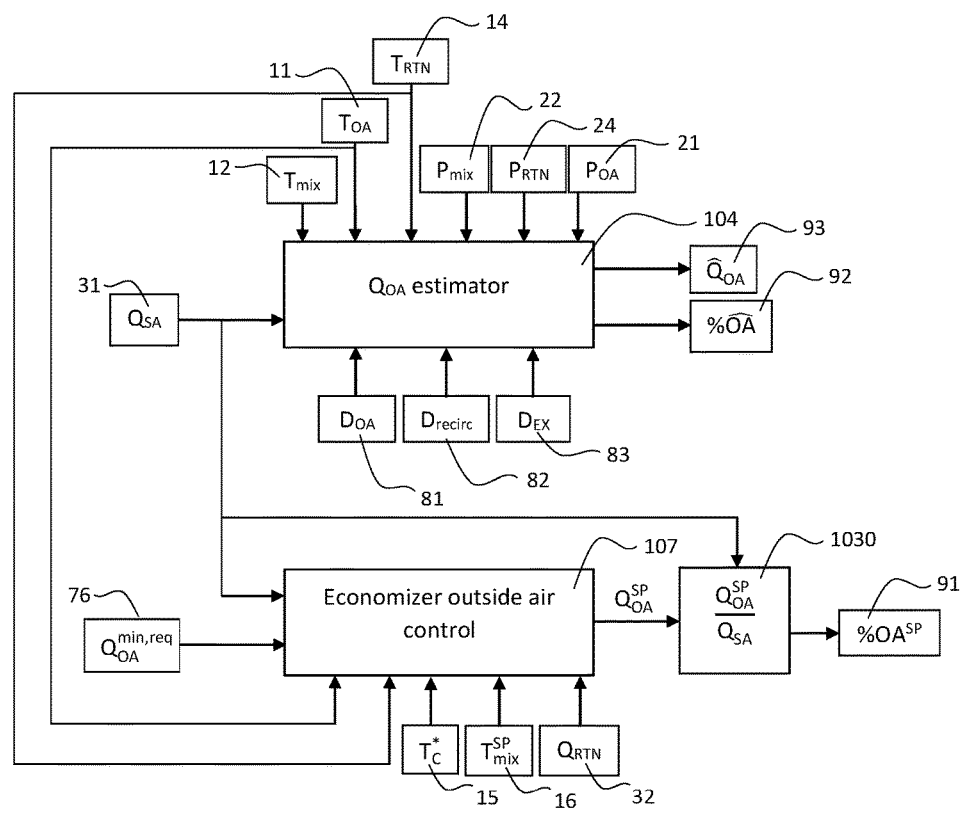
FIG. 7 is a block diagram of an outside air estimation process for the economizer outside air control to provide outside air percentage set point, according to one arrangement.

As illustrated in FIG. 5, the controller 100 is configured to execute control element 1010 to determine an estimated percentage of outside air received by the damper apparatus 200 based upon an outside air temperature, a mixed air temperature which includes a recirculated air and outside air, and a return air temperature. For example, the estimated percentage of outside air provided by the damper apparatus, % $\widehat{OA}$, 92 can be calculated using the $Q_{OA}$ estimator 103 shown in FIG. 6 and the estimator 104 in FIG. 7. FIG. 6 shows operation of the estimator based on receiving economizer air temperature sensor measurements ($T_{OA}$, $T_{mix}$, $T_{RTN}$) 11, 12, 14, while FIG. 7 shows operation of the estimator based on receiving measurements from air pressure sensors ($P_{OA}$, $P_{mix}$, $P_{RTN}$) 21, 22, 24; and damper positions ($D_{OA}$, $D_{recirc}$, $D_{EX}$) 81, 82, 83. Both methods relate the supply air flow volume to the estimate of outside air flow rate and % OA, as will be described in detail below.

Returning to FIG. 5, the controller 100 is configured to execute control element 1011 to determine a percentage of outside air set point % $OA^{SP}$ to be provided by the damper apparatus. For example, the controller calculates the percentage of outside air set point by executing the economizer OA control 107 shown in FIGS. 6 and 7. This will be described in detail below, with respect to FIG. 11.

In one arrangement, when determining the percentage of outside air set point that will be provided by the damper apparatus, the controller 100 is configured to determine a ratio of an outside air flow volume set point to be provided by the damper apparatus and a total flow volume of air provided by the damper apparatus. An example of this is shown in FIGS. 6 and 7. As shown, the ratio of the OA flow volume set point, $Q_{OA}^{SP}$, is determined by the economizer outside air (OA) control 107, and then the ratio with the total flow volume provided by the damper apparatus, $Q_{SA}$, 31 is taken in control element 1030 to determine % $OA^{SP}$. Details of the process of FIGS. 6 and 7 will be described below.

Figure 8:
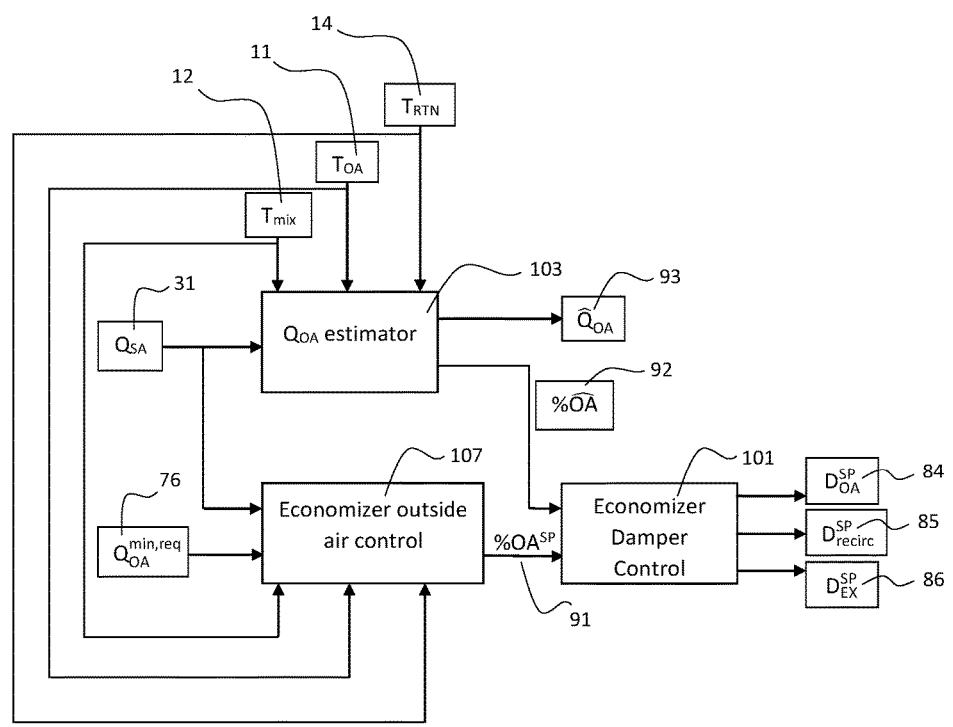
FIG. 8 is a block diagram showing a relation between damper control logic, which determines required damper positions, and the OA estimator and economizer OA control, according to one arrangement.
Figure 9:
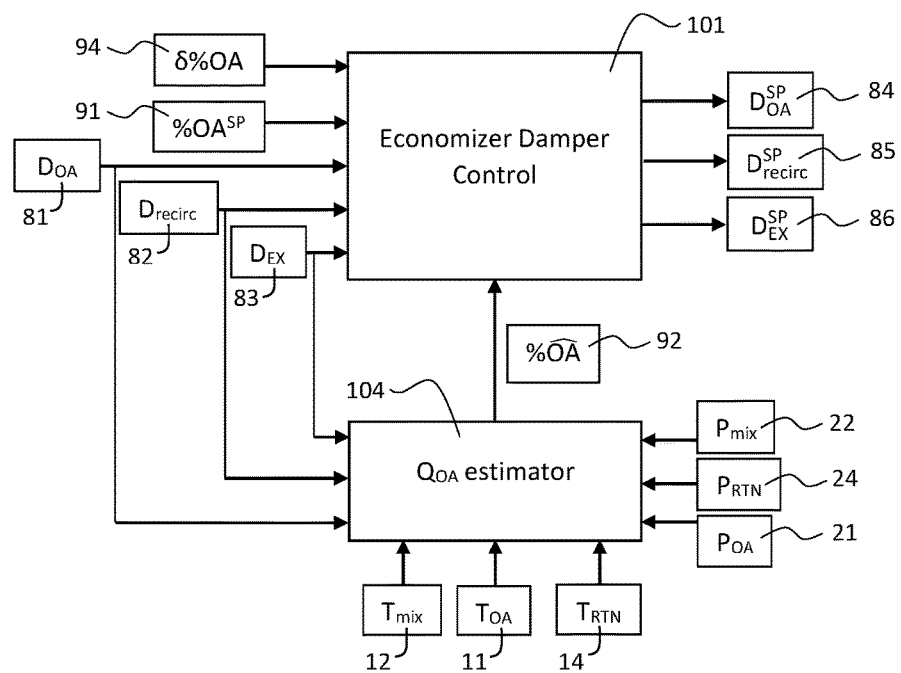
FIG. 9 shows example data inputs to the damper control, according to one arrangement.

In one arrangement, the controller 100 is further configured to determine the percentage of outside air provided by the damper apparatus based on one or more of an outside air temperature, a return air temperature, a mixed air temperature, an outside air damper position, a recirculated air damper position, an exhaust air damper position, an outside air pressure, a mixed air pressure, a return air pressure, and a supply air pressure. FIGS. 6 and 8 show the implementation of the outside air flow estimator using only the economizer temperatures, while FIGS. 7 and 9 show the implementation in terms of economizer temperatures, pressures, and damper positions.

Returning to FIG. 5 for the control of the damper apparatus 200, the controller 100 is configured to relate the estimated percentage of outside air, % $\widehat{OA}$, to the required percentage of outside air % $OA^{SP}$ by executing control element 1012. If the controller 100 detects that ratio of % $\widehat{OA}$ to % $OA^{SP}$ is less than to one (i.e., the condition is met), the damper apparatus 200 is configured to increase the flow volume of outside air provided by an outside air damper 81 and decreasing the flow volume of recirculated air provided by a recirculating air damper 82. In one arrangement, the damper apparatus 200 is configured to increase the outside air flow rate by opening the OA damper and closing the recirculating air damper, as indicated in element 1013. If the ratio of % $\widehat{OA}$ to % $OA^{SP}$ is greater than or equal to one plus $\delta_1$, the controller 100 is configured to execute control element 1014. Here, $\delta_1$ is a user specified value which acts as a dead-band to minimize or prevent rapid switching between the execution of elements 1012 and 1014, and could be zero. This can happen when % OA changes quickly. When this condition is met for example, the damper apparatus 200 is configured to decrease the outside air flow rate by closing the OA damper and opening the recirculating or bypass damper, as indicated in element 1015.

If neither case is met (e.g., execution of control element 1012 or 1014 provides a negative result), or following execution of control element 1013 or control element 1015, the controller 100 is configured to execute control element 1016 to repeat the process and update the %$\widehat{OA}$ and %$OA^{SP}$ values on a suitably determined time interval. The time interval in 1016 should be chosen relative to times scales of the economizer, reflective of how fast temperatures and flow rates change. For example, the controller is configured to update the estimated percentage of outside air provided to the airflow system %$\widehat{OA}$, update the required percentage of outside air provided to the airflow system %$OA^{SP}$, and execute control elements 1012 and 1014 to relate the updated estimated percentage of outside air to the updated required percentage of outside air.

In one arrangement, the controller 100 is configured to determine the % OA when it is difficult to directly measure the outside airflow rate. Two different procedures can be used to determine the % OA 92 based on different sets of measurements, as provided by the $Q_{OA}$ estimator 103 of FIG. 6 or the QUA estimator 104 of FIG. 7. The outside air estimator based on the measured temperatures in the estimator 103 in FIG. 6 is based on the relationship of the mixed air temperature in terms of the mass weighted temperatures of the outside and recirculated air from:

$$T_{mix} = \frac{Q_{OA}T_{OA} - Q_{recirc}T_{RTN}}{Q_{SA}} = \frac{Q_{OA}T_{OA} - (Q_{SA} - Q_{OA})T_{RTN}}{Q_{SA}} \qquad \text{Eqn. 2}$$

Since $Q_{recirc} = Q_{SA} - Q_{OA}$, Equation 2 can be manipulated to obtain the following relationship for % $OA = Q_{OA}/Q_{SA}$:

$$T_{mix} = T_{RTN} + \% OA \times \Delta T \qquad \text{Eqn. 3}$$

Where since $\Delta T = T_{OA} - T_{RTN}$ Eqn. 4

Then $$\% OA = \frac{T_{mix} - T_{RTN}}{T_{OA} - T_{RTN}} \qquad \text{Eqn. 5}$$

With continued reference to FIG. 6, controller 100 (e.g., QUA estimator 103) determines the percentage of OA by measuring the temperatures in EQN 5, and evaluating the ratio of differences in temperatures from the return air (element 74 in FIG. 2A) and OA airflow (element 71 in FIG. 2A) streams that combine to make up the mixed air flow. The controller 100 uses this value in control elements 1001 and 1010 (FIGS. 4 and 5) for both the VAV and economizer control, and thus are updated according to control elements 1006 and 1016 (FIGS. 4 and 5).

Figure 10:
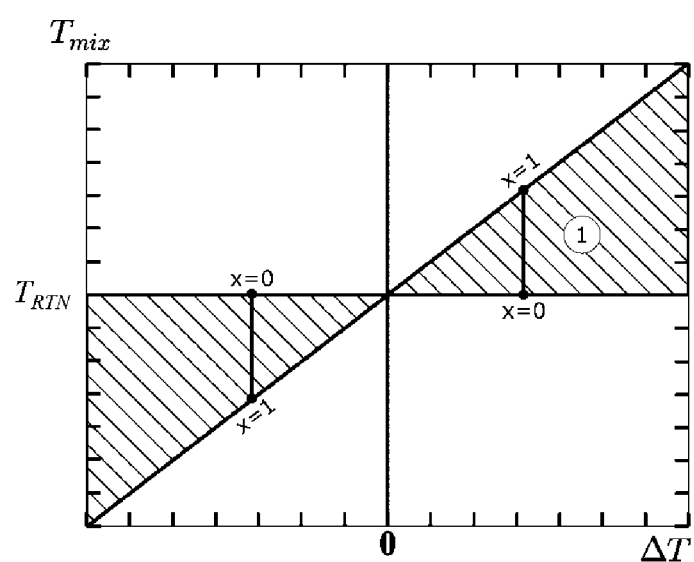
FIG. 10 is a graphical representation of the percentage of outside air set relative to the economizer air temperatures.

The nature of these relations are plotted in FIG. 10, which shows that for small $\Delta T$, i.e. when $T_{OA} \sim T_{RTN}$, the results can be very sensitive to measurement errors, and determining the actual % OA is difficult. In this case, the controller 100 can use relationships based on different damper positions and pressures in the economizer.

To determine the OA flow rate when $T_{OA}$ is close to but greater than $T_{RTN}$ ($T_{OA} \gtrsim T_{RTN}$) region 1, it is difficult to use the mixed air temperature relations since there is low range of % OA for $|T_{OA} - T_{RTN}| \lesssim 8°$ F. However, this is a critical range to resolve since that is the condition when the economizer switches from ~100% OA to the $Q_{OA}^{min,req}$.

An alternative OA % estimation method that the control 100 is configured to execute is to relate economizer flows to a pressure difference and a resistance, such as indicated in FIG. 7. The three critical flows can be represented by:

$$Q_{OA} = \frac{P_{OA} - P_{mix}}{R_{OA}} \qquad \text{Eqn. 6}$$

$$Q_{recirc} = \frac{P_{RTN} - P_{mix}}{R_{recirc}} \qquad \text{Eqn. 7}$$

$$Q_{EX} = \frac{P_{RTN} - P_{OA}}{R_{EX}} \qquad \text{Eqn. 8}$$

The resistances can be related to the damper position as functions of damper position, $D_i$ by:

$$R_i = f(D_i, P_j, P_i) \qquad \text{Eqn. 9}$$

where the value of damper position is bounded by $0 < D_i < 1$ (closed to fully open), and $P_f$ and $P_j$ are pressures across the dampers. One approximation is that the resistance to scale inversely with damper opening percentage, as:

$$R_i = \frac{1}{\alpha D_i} \qquad \text{Eqn. 10}$$

where $\alpha$ is a scaling coefficient. For a more accurate approximation, a more complicated relationship can be used that depends on the pressure drop of the open damper relative to the pressure drop of the system. Thus, the actual damper resistance function can vary depending on the spatial configuration of the economizer and duct system.

Thus to estimate $Q_{OA}$ using Eqn. 6, when $|T_{OA} - T_{RTN}| \lesssim 8°$ F., controller 100 can base the estimation by using the proportional $D_i$ relationship (Eqn. 10) for the OA estimator 104 in FIG. 7, using the measured damper positions and pressures. If greater accuracy is desired, one could identify the specific damper curve relationship for the system. The relation can be determined using the relationship derived for relating the mixed, outside, and return temperatures to the % OA, for data obtained when $|T_{OA} - T_{RTN}| \gtrsim 8°$ F. This entails developing a correlation functions for different operating conditions (i.e. $D_i$) to establish the relative resistance where $|T_{OA} - T_{RTN}| \gtrsim 8°$ F., and then using these relations when $|T_{OA} - T_{RTN}| \lesssim 8°$ F. in terms of Eqn. 6. Combining the temperature and resistance expressions for $Q_{OA}$, one finds:

$$Q_{OA} = \frac{P_{OA} - P_{mix}}{R_{OA}} = \left(\frac{T_{mix} - T_{RTN}}{T_{OA} - T_{RTN}}\right) Q_{SA} \qquad \text{Eqn. 11}$$

which yields:

$$\frac{1}{R_{OA}} = \frac{Q_{SA}}{P_{OA} - P_{mix}} \left(\frac{T_{mix} - T_{RTN}}{T_{OA} - T_{RTN}}\right) \qquad \text{Eqn. 12}$$

and one can determine $R_{OA}(D_i)$ for different damper positions. In this arrangement, controller 100 utilizes a general functional damper relationship observed (such as a cubic polynomial), and solve for the unknown coefficients by least square fit to data. In this case, the correlations would be obtained from data obtained when $|T_{OA} - T_{RTN}| \gtrsim 8°$ F.

Controller 100 can be configured to implement these estimation processes. FIG. 6 shows how the controller 100 can implement the estimation process based on the economizer temperatures, while FIG. 7 shows how it would be implemented using economizer pressures, damper positions, as well as economizer temperatures. These relations can be implemented in a central controller 100, or in a separate controllers or control functions 103, 104 that communicates to other control and measurement modules.

One way for the controller 100 to check the fidelity of the OA % estimation process is to use the mass balance relations of the economizer:

$$Q_{SA} = Q_{OA} + Q_{recirc} \qquad \text{Eqn. 13}$$

$$Q_{RTN} = Q_{EX} + Q_{recirc} \qquad \text{Eqn. 14}$$

and check that the left hand side quantities ($Q_{SA}$ and $Q_{RTN}$) which can be directly measured, are equal to the estimated resistance/pressure based estimates from Eqns. 6, 7, and 8. Control 100 would determine differences in values, which are important to identify so that a default control law can be implemented and an operator alert initiated.

Since it is important for the controller 100 to implement good performance for the damper apparatus 200 in terms of achieving the desired % OA, this can become a problem for proper operation of the air handler/economizer when $T_{OA} \sim T_{RTN}$. For these cases, the following $Q_{OA}^{SP}$ and % $OA^{SP}$ control practice can be applied by controller 100:

A) When the outside temperature is less than the return air temperature, 100% of the airflow should be outside air, and thus the dampers should be controlled in that fashion.
B) When the outside air temperature is greater but close to the return air temperature, then the dampers should be either controlled to preset values such that the amount of outside air is equal to that of $Q_{OA}^{min,req}$, or an estimate based on damper positions and pressures.

In one arrangement, the controller 100 is configured to adjust the damper positions of the damper apparatus 200, as a result of the control actions 1013, 1014 shown in FIG. 5. The damper positions in the damper control apparatus 200 are determined by the economizer damper control 101 shown in FIG. 8 and FIG. 9. To control the dampers, the control utilizes feedback of the damper positions ($D_{OA}$, $D_{recirc}$, $D_{EX}$ 81, 82, 83), a percentage of outside air 92, a percentage the outside air set point 91, and the error in the outside air percentage, δ% OA, 94 to determine new set points for the dampers ($D^{SP}$, $D^{SP}$, $D^{SP}$ 84, 85, 86). determination of the damper position set points can be implemented through a proportional-integral-derivative controller using the δ% OA 94 as an error signal. An alternative is to implement the control using the relations expressed in Equations 6, 7, and 8, provided above, and the damper resistance relations to determine the new damper positions using model based control.

Figure 11:
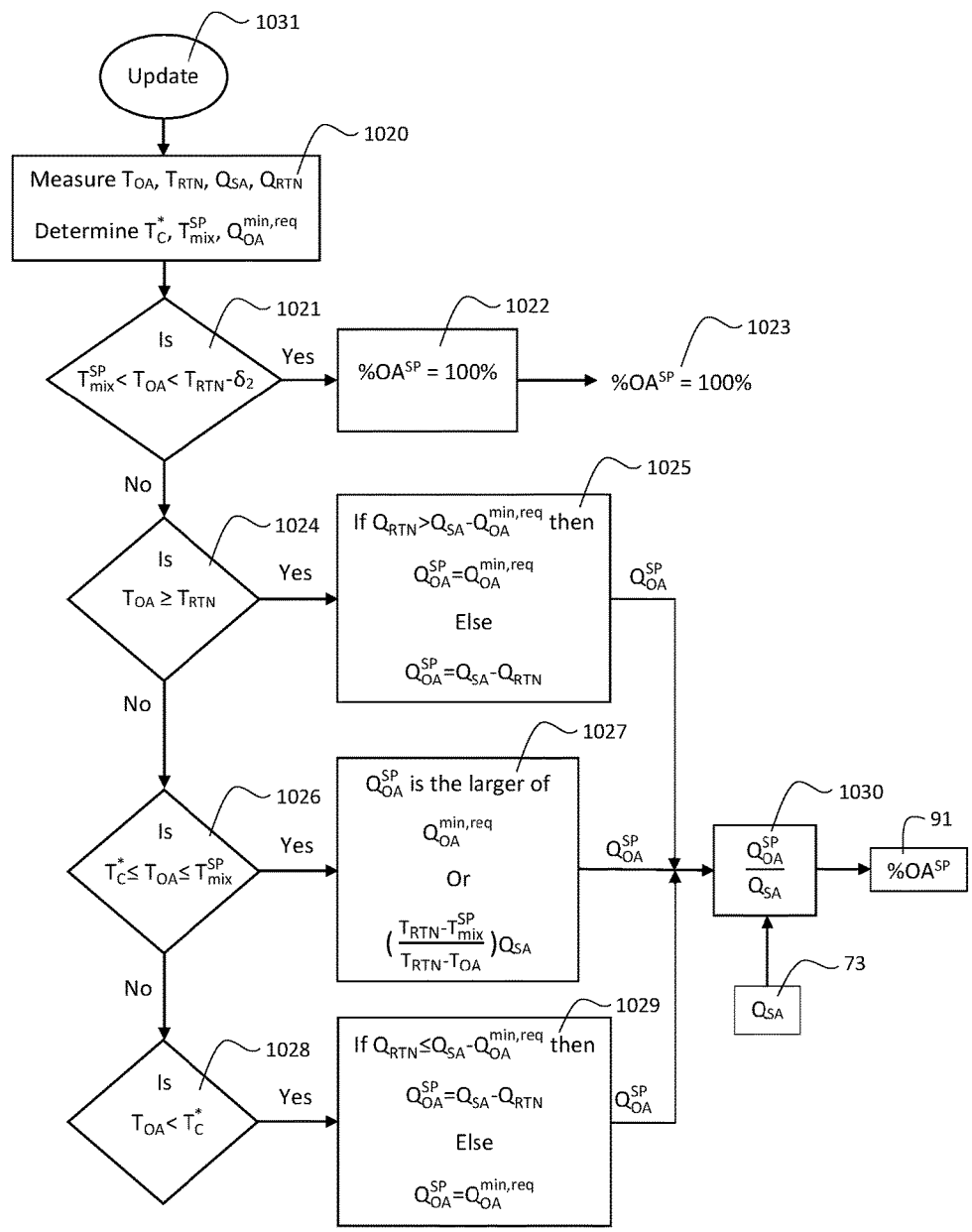
FIG. 11 is a flow diagram of the economizer OA control when determining the outside percentage set point for different outside air temperatures, according to one arrangement.

In one arrangement, the controller 100 also is configured to determine how much OA the damper apparatus should supply to the building in order to minimize the total airflow. FIG. 11 shows an example control process executed by the economizer OA control 107, that determines $Q_{OA}^{SP}$ and % $OA^{SP}$. In this process, measured outside air temperature $T_{OA}$ 11 is compared to the return air temperature $T_{RTN}$ 14, the mixed air temperature set point, $T_{mix}^{SP}$, 16, the $T_C^*$ 15 cut-off temperature in elements 1021, 1024, 1026, 1028 to determine which processes given in elements 1022, 1025, 1027, or 1029 should be used to determine % $OA^{SP}$ 91. These calculations also use values of the supply air and return air flow rates, as well as the minimum required outside air for the zones supplied by the damper apparatus. The mixed air temperature set point is a user-defined value.

$T_C^*$ represents the cold outside air temperature condition where using a minimal amount of outside air is preferable in order to save economizer energy during heating 601. The process 1020 considers two cases to determine the appropriate value in order to supply enough air:

If $Q_{RTN} > Q_{SA} - Q_{OA}^{min,req}$ $\qquad$ Eqn. 15

Then $T_C^* = \dfrac{Q_{SA} T_{mix}^{SP} - (Q_{SA} - Q_{OA}^{min,req}) T_{RTN}}{Q_{OA}^{min,req}}$ $\qquad$ Eqn. 16 or

If $Q_{RTN} < Q_{SA} - Q_{OA}^{min,req}$ $\qquad$ Eqn. 17

Then $T_C^* = \dfrac{Q_{SA} T_{mix}^{SP} - (Q_{RTN}) T_{RTN}}{Q_{SA} - Q_{RTN}}$ $\qquad$ Eqn. 18

The controller 100 is configured to determine which of the different temperature conditions are meet through control elements 1021, 1024, 1026 and 1028, so that the appropriate determination of outside air flow rate set point can be determined. For example, if the outside temperature $T_{OA}$ falls between $T_{mix}^{SP}$ and ($T_{RTN} - \delta_2$) according to 1021, the outside air percentage is set to 100% 1022, 1023 to take advantage of energy savings that result from using OA that has lower cooling load than the return air. Here, $\delta_2$ is a value chosen to prevent chattering between two different flow rates by implementing a dead-band.

Execution of element 1024 determines if $T_{OA}$ is larger than or equal to $T_{RTN}$ 1024, and if so $Q_{OA}^{SP}$ is determined by the procedure given in 1025, where if the return airflow is satisfied by:

$$Q_{RTN} > Q_{SA} - Q_{OA}^{min,req} \qquad \text{Eqn. 19}$$

then $Q_{OA}^{SP}$ is set equal to the minimum outside air flow volume required by zone conditions served by the damper apparatus, $Q_{OA}^{min,req}$ 1025. Otherwise, $Q_{OA}^{SP}$ is set according to:

$$Q_{OA}^{SP} = Q_{SA} - Q_{RTN} \qquad \text{Eqn. 20}$$

It is important to recognize that $Q_{OA}^{min,req}$ is distinct from $Q_{OA}^{SP}$, in that $Q_{OA}^{min,req}$ is the minimum flow volume required to provide adequate outside air to the building space based upon ASHRAE 62.1 indoor air quality standards, and $Q_{OA}^{SP}$ is determined by the logic in FIG. 11.

Figure 12:
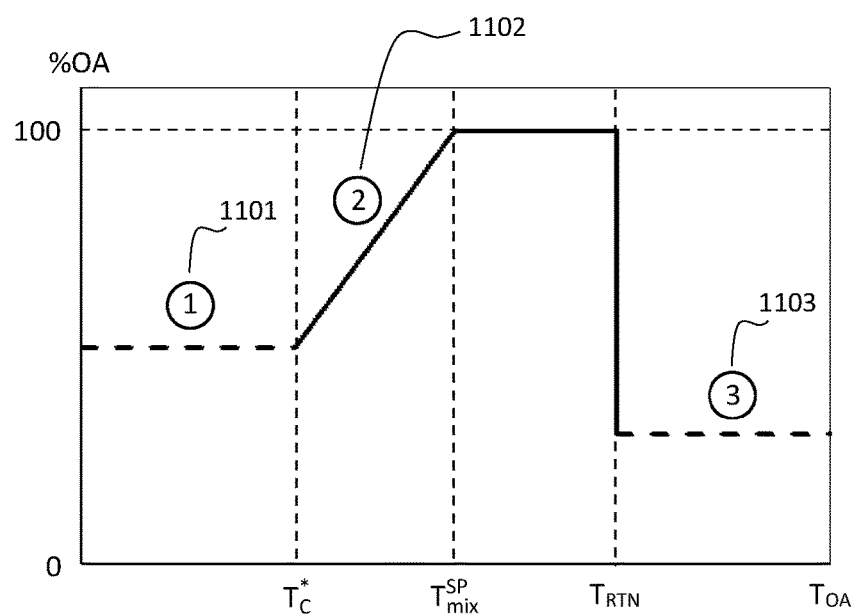
FIG. 12 is a plot of the relation of mixed air temperature, to the % of OA supplied by an economizer in terms of measured mixed air temperature, outside air temperature, and return air temperature.

The plot in FIG. 12 shows a visualization of the control implementation of FIG. 11 in determining the percentage of airside air needed for different outside air temperatures relative to the calculated air temperature set points. The case satisfied in 1024 corresponds to region 3 1103 in FIG. 12, noting that the dashed line is not necessarily constant over the entire range. The outside air percentage is minimized in this case to reduce the amount of cooling needed to condition the outside air, but only if there is enough return air to be used.

If $T_{OA}$ is equal to or falls between $T_C^*$ and $T_{mix}^{SP}$ according to 1026, then $Q_{OA}^{SP}$ is set to the larger value 1027 of either $Q_{OA}^{min,req}$ or:

$$Q_{OA}^{SP} = \left( \dfrac{T_{RTN} - T_{mix}^{SP}}{T_{RTN} - T_{OA}} \right) Q_{SA} \qquad \text{Eqn. 21}$$

This corresponds to the line in region 2 1102 of FIG. 12. This is done to ensure the outside air ventilation requirement is met, and, if there is not enough return air, then more outside air is used to meet the supply air demand.

Controller 100 also evaluates process 1028. In determining when $T_{OA}$ is smaller than $T_C^*$ if:

$$Q_{RTN} \leq Q_{SA} - Q_{OA}^{min,req} \qquad \text{Eqn. 22}$$

is satisfied, then $Q_{OA}^{SP}$ is set according to 1029:

$$Q_{OA}^{SP} = Q_{SA} - Q_{RTN} \qquad \text{Eqn. 23}$$

Otherwise, $Q_{OA}^{SP}$ is set equal to $Q_{OA}^{min,req}$ 1029. Both cases in 1029 correspond to region 1 1101 in FIG. 12, again noting that the dashed line is not necessarily constant over the entire range nor is it necessarily equal to the dashed line in region 3 1103.

Controller 100 also determines the outside air set point percentage. When the outside air temperatures below $T_{mix}^{SP}$ or above $T_{RTN}$, $Q_{OA}^{SP}$ 1030, is divided by $Q_{SA}$ 73 to determine % $OA^{SP}$ 91.

When controller 100 executes the process in FIG. 11, it continues to update variables by using new measurement values in the calculations shown in processes 1020 through 1030. Suitable time scales for the update period in 1031 should be chosen relative to the typical time scales of the economizer. Typical time scales reflect the time that measurements and determined variables change over time.

In general, while we show in Equation 1, FIGS. 3B, 4, 5, and 11, and other control related implementations, a specific mathematical relationship, to implement the control procedure, the control algorithm can be expressed in a number of other ways to achieve the same affect, such as in terms of absolute values, differences of absolute values, or using different normalization factors.

While various embodiments of the innovation have been particularly shown and described, it will be understood by those skilled in the art that various changes in form and details may be made therein without departing from the spirit and scope of the innovation as defined by the appended claims.

What is claimed is:

1. An airflow system, comprising:
a damper apparatus configured to adjust a flow volume of recirculated air and a flow volume of outside air within the airflow system;
a variable air volume (VAV) apparatus disposed in fluid communication with the damper apparatus; and
a controller having a processor and a memory, disposed in operative communication with the damper apparatus and the VAV apparatus, the controller configured to:
determine a percentage of outside air provided to the airflow system by the damper apparatus based upon at least one of (i) an air temperature, (ii) an air pressure, and (iii) a damper position of a damper apparatus of the airflow system;
determine a minimum flow volume provided by the VAV apparatus of the airflow system, the minimum flow volume relating a required flow volume of outside air provided by the VAV apparatus to a zone and the percentage of outside air provided to the airflow system by the damper apparatus; and
adjust a flow volume of air provided by the VAV apparatus to the zone based upon the determined minimum flow volume provided by the VAV apparatus.

2. The airflow system of claim 1, wherein the controller is further configured to:
measure an actual flow volume of air provided by the VAV apparatus;
relate the actual flow volume of air provided by the VAV apparatus to the determined minimum flow volume provided by the VAV apparatus; and
when the relation between the actual flow volume of air provided by the VAV apparatus and the minimum flow volume provided by the VAV apparatus is less than a threshold value, when adjusting the flow volume of air provided by the VAV apparatus to the zone, the controller is configured to adjust a position of a damper of the VAV apparatus to increase a volume of the actual flow volume of air provided by the VAV apparatus.

3. The airflow system of claim 2, wherein when the relation between the actual flow volume of air provided by the VAV apparatus and the minimum flow volume provided by the VAV apparatus meets the threshold value, the controller is configured to:
update measurement of the actual flow volume of air provided by the VAV apparatus; and
relate the updated actual flow volume of air provided by the VAV apparatus to the determined minimum flow volume provided by the VAV apparatus.

4. The airflow system of claim 2, wherein the controller is configured to:
compare the actual flow volume of air provided by the VAV apparatus to a minimum VAV apparatus-required flow volume value;
when the actual flow volume of air provided by the VAV apparatus is less than the minimum VAV apparatus-required flow volume value, when adjusting the flow volume of air provided by the VAV apparatus to the zone the controller is configured to adjust a position of a damper of the VAV apparatus to increase a volume of the actual flow volume of air provided by the VAV apparatus; and
when the actual flow volume of air provided by the VAV apparatus is greater than the minimum VAV apparatus-required flow volume value, when adjusting the flow volume of air provided by the VAV apparatus to the zone, the controller is configured to maintain the position of the damper of the VAV apparatus to maintain the volume of the actual flow volume of air provided by the VAV apparatus.

5. The airflow system of claim 1, wherein:
when determining the required volume flow rate of the VAV apparatus of the airflow system, the controller is configured to determine a required minimum volume flow rate for each VAV apparatus of a set of VAV apparatuses; and
when adjusting the flow volume of air provided by the VAV apparatus, the controller is configured to adjust the flow volume of air provided by each VAV apparatus based upon the respective required minimum volume flow rate of each VAV apparatus.

6. The airflow system of claim 1, wherein the controller is configured to:
determine an updated percentage of outside air provided to the airflow system by the damper apparatus; and
determine an updated minimum flow volume provided by a variable air volume (VAV) apparatus of the airflow system, the updated minimum flow volume relating the required flow volume of outside air provided by the VAV apparatus to a zone and the updated percentage of outside air provided to the airflow system by the damper apparatus; and
adjust a flow volume of air provided by the VAV apparatus to the zone based upon the updated minimum flow volume provided by the VAV apparatus.

7. The airflow system of claim 1, wherein the controller is further configured to:
  determine an estimated percentage of outside air provided by the damper apparatus based upon an outside air temperature, a mixed air temperature which includes a recirculated air and outside air, and a return air temperature;
  determine a percentage of outside air set point provided by the damper apparatus;
  relate the estimated percentage of outside air to the percentage of outside air set point;
  when the relation between the estimated percentage of outside air and the percentage of outside air set point is less than a threshold value, the damper apparatus is configured to increase the flow volume of outside air provided by an outside air damper and decreasing the flow volume of recirculated air provided by a recirculating air damper; and
  when the relation between the estimated percentage of outside air and the percentage of outside air set point is above a threshold value, the damper apparatus is configured to decrease the flow volume of outside air provided by the outside air damper and increasing the flow volume of recirculated air provided by the recirculating air damper.

8. The airflow system of claim 7, wherein when determining the set point percentage of outside air provided by the damper apparatus, the controller is configured to determine a ratio of a flow volume of outside air set point provided by the damper apparatus and a total flow volume of air provided by the damper apparatus.

9. The airflow system of claim 7, wherein when determining the percentage of outside air set point provided by the damper apparatus, the controller is configured to determine the percentage of outside air provided by the damper apparatus based on one or more of an outside air temperature, a return air temperature, a mixed air temperature, an outside air damper position, a recirculated air damper position, an exhaust air damper position, an outside air pressure, a mixed air pressure, a return air pressure, and a supply air pressure.

10. The airflow system of claim 7, wherein the controller is configured to:
  update the estimated percentage of outside air provided to the airflow system;
  update the percentage of outside air set point provided to the airflow system; and
  relate the updated estimated percentage of outside air to the updated percentage of outside air set point.

11. In a damper apparatus of an airflow system, a method of adjusting airflow, comprising:
  determining, by a controller of the airflow system, an estimated percentage of outside air provided by the damper apparatus;
  determining, by the controller, a set point percentage of outside air provided by the damper apparatus;
  relating, by the controller, the estimated percentage of outside air to the set point percentage of outside air;
  when the relation between the estimated percentage of outside air and the set point percentage of outside air is less than a threshold value, increasing, by the damper apparatus, a flow volume of outside air provided by an outside air damper and decreasing a flow volume of recirculated air provided by a recirculating air damper; and
  when the relation between the estimated percentage of outside air and the set point percentage of outside air is above a threshold value, decreasing, by the damper apparatus, the flow volume of outside air provided by the outside air damper and increasing the flow volume of recirculated air provided by the recirculating air damper;
  wherein determining the set point percentage of outside air provided by the damper apparatus comprises determining, by the controller, the set point percentage of outside air provided by the damper apparatus based upon a ratio of a required flow volume of outside air provided to the airflow system and a total flow volume of air provided by the damper apparatus.

12. The method of claim 11, wherein determining the set point estimated percentage of outside air provided by the damper apparatus comprises determining, by the controller, the estimated percentage of outside air provided by the damper apparatus based on one or more of an outside air temperature, a return air temperature, a mixed air temperature, an outside air damper position, a recirculated air damper position, an exhaust air damper position, an outside air pressure, a mixed air pressure, a return air pressure, and a supply air pressure.

13. The method of claim 11, comprising:
  updating, by the controller, the estimated percentage of outside air provided to the airflow system;
  updating, by the controller, the set point percentage of outside air provided to the airflow system; and
  relating, by the controller, the updated estimated percentage of outside air to the updated set point percentage of outside air.

14. The method of claim 11 further comprising adjusting, by the controller, the set point percentage of outside air provided to the airflow system.

15. In an airflow system, a method of adjusting airflow, comprising:
  determining, by a damper apparatus, an estimated percentage of outside air provided to the airflow system based upon an outside air temperature and a mixed air temperature, the mixed air including recirculated air and outside air, and a return temperature;
  determining, by the damper apparatus, a set point percentage of outside air provided by the damper apparatus;
  relating, by the damper apparatus, the estimated percentage of outside air to the percentage of outside air set point;
  when the relation between the estimated percentage of outside air and the set point percentage of outside air is less than a threshold value, increasing, by the damper apparatus, a flow volume of outside air provided by an outside air damper and decreasing a flow volume of recirculated air provided by a recirculating air damper;
  when the relation between the estimated percentage of outside air and the set point percentage of outside air is greater than a threshold value, decreasing, by the damper apparatus, the flow volume of outside air provided by the outside air damper and increasing the flow volume of recirculated air provided by the recirculating air damper;
  determining, by a variable air volume (VAV) apparatus, a minimum flow volume provided by the VAV apparatus of the airflow system, the minimum flow volume relating a required flow volume of outside air provided by the VAV apparatus to a zone and the estimated percentage of outside air provided to the airflow system by the damper apparatus; and adjusting, by the VAV apparatus, a flow volume of air provided by the VAV apparatus to the zone based upon the determined minimum flow volume provided by the VAV apparatus.

16. The method of claim 15, wherein determining the set point percentage of outside air provided by the damper apparatus comprises determining, by the damper apparatus, a ratio of a required flow volume of outside air provided by the damper apparatus and a total flow volume of air provided by the damper apparatus.

17. The method of claim 15, wherein determining the estimated percentage of outside air provided by the damper apparatus comprises determining, by the damper apparatus, the estimated percentage of outside air provided by the damper apparatus based on one or more of an outside air temperature, a return air temperature, a mixed air temperature, an outside air damper position, a recirculated air damper position, an exhaust air damper position, an outside air pressure, a mixed air pressure, a return air pressure, and a supply air pressure.

18. The method of claim 15, further comprising:
measuring, by the VAV apparatus, an actual flow volume of air provided by the VAV apparatus; and
relating, by the VAV apparatus, the actual flow volume of air provided by the VAV apparatus to the determined minimum flow volume provided by the VAV apparatus;
when the relation between the actual flow volume of air provided by the VAV apparatus and the minimum flow volume provided by the VAV apparatus is less than a threshold value, adjusting the flow volume of air provided by the VAV apparatus to the zone comprises adjusting, by the VAV apparatus, a position of a damper of the VAV apparatus to increase a volume of the actual flow volume of air provided by the VAV apparatus.

19. The method of claim 18, wherein when the relation between the actual flow volume of air provided by the VAV apparatus and the minimum flow volume provided by the VAV apparatus meets the threshold value:
updating, by the VAV apparatus, a measurement of the actual flow volume of air provided by the VAV apparatus; and
relating, by the VAV apparatus, the updated actual flow volume of air provided by the VAV apparatus to the determined minimum flow volume provided by the VAV apparatus.

20. An airflow system, comprising:
a damper apparatus configured to adjust a flow volume of recirculated air and a flow volume of outside air within the airflow system;
a variable air volume (VAV) apparatus disposed in fluid communication with the damper apparatus; and
a controller having a processor and a memory, disposed in operative communication with the damper apparatus and the VAV apparatus, the controller configured to:
determine a percentage of outside air provided to the airflow system by the damper apparatus;
determine a minimum flow volume provided by the VAV apparatus of the airflow system, the minimum flow volume relating a required flow volume of outside air provided by the VAV apparatus to a zone and the percentage of outside air provided to the airflow system by the damper apparatus; and
adjust a flow volume of air provided by the VAV apparatus to the zone based upon the determined minimum flow volume provided by the VAV apparatus.

\* \* \* \* \*